Nov. 19, 1968    F. A. GROTH    3,411,461
APPARATUS FOR FORMING PIZZA SHELLS
Filed May 2, 1966    5 Sheets-Sheet 1

INVENTOR
Fred A. Groth
BY Dressler, Goldsmith, Clement & Gordon
ATTORNEYS

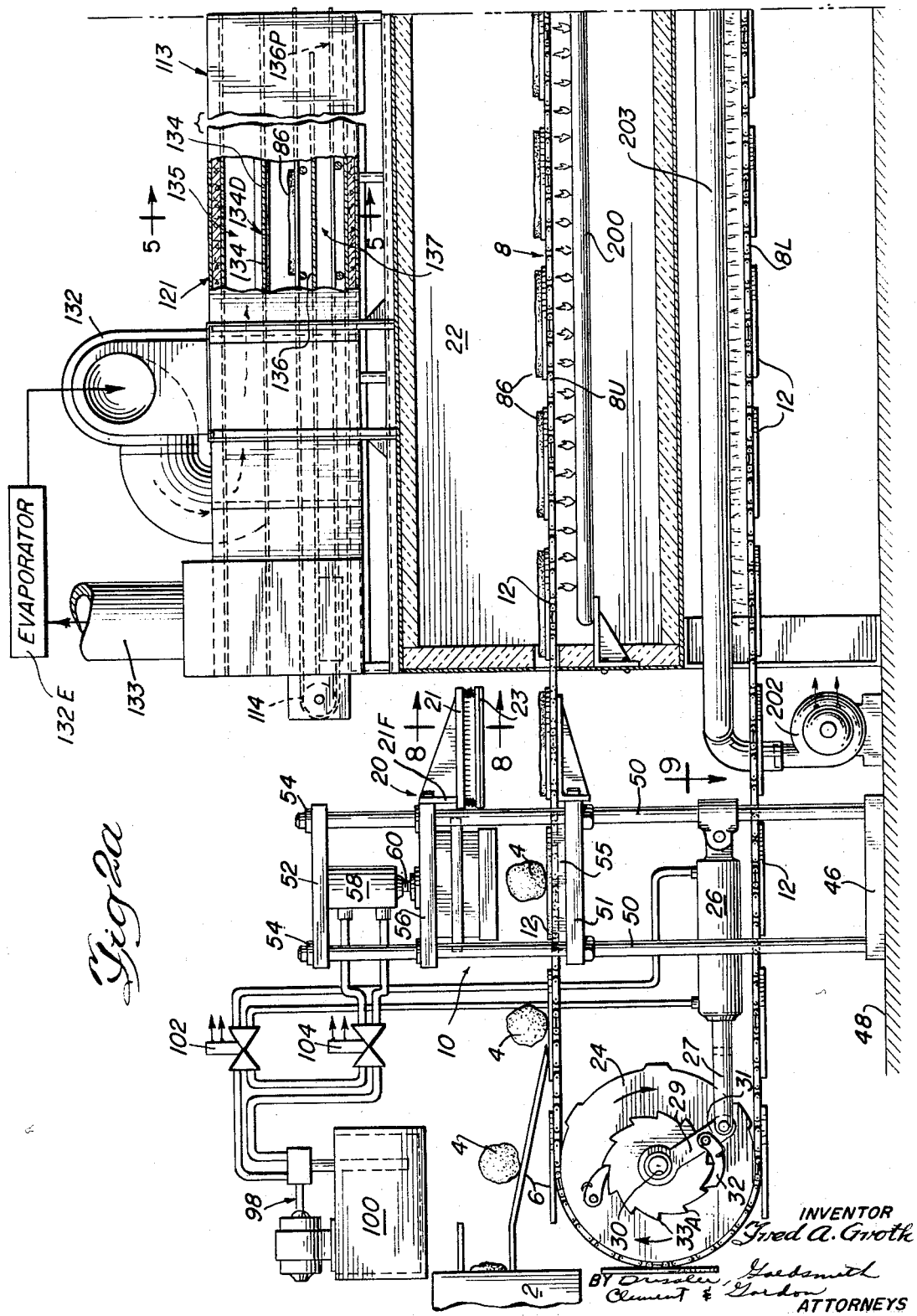

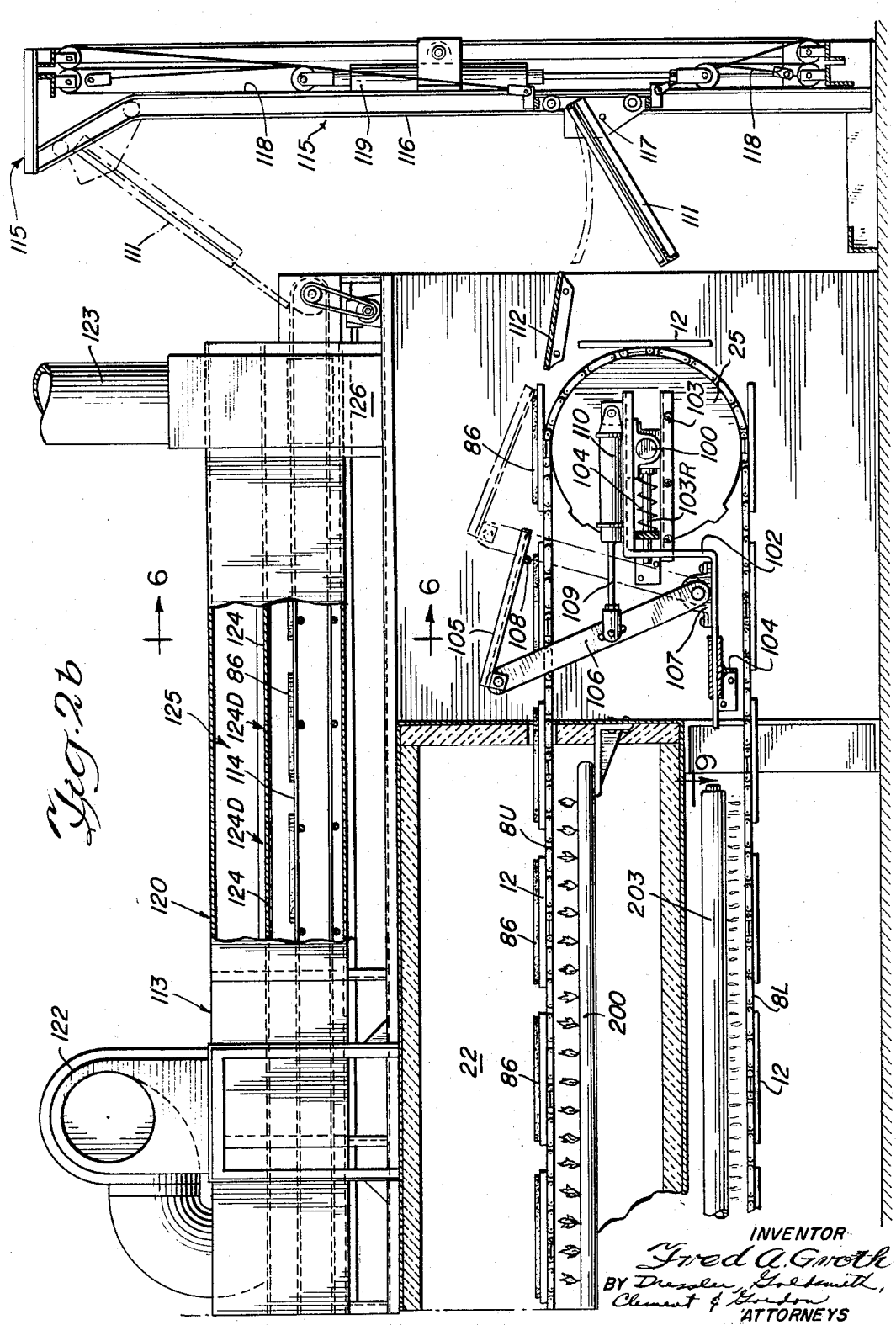

Nov. 19, 1968  F. A. GROTH  3,411,461
APPARATUS FOR FORMING PIZZA SHELLS
Filed May 2, 1966  5 Sheets-Sheet 4

INVENTOR.
Fred A. Groth
BY
Dressler, Goldsmith, Clement & Gordon
Attorneys

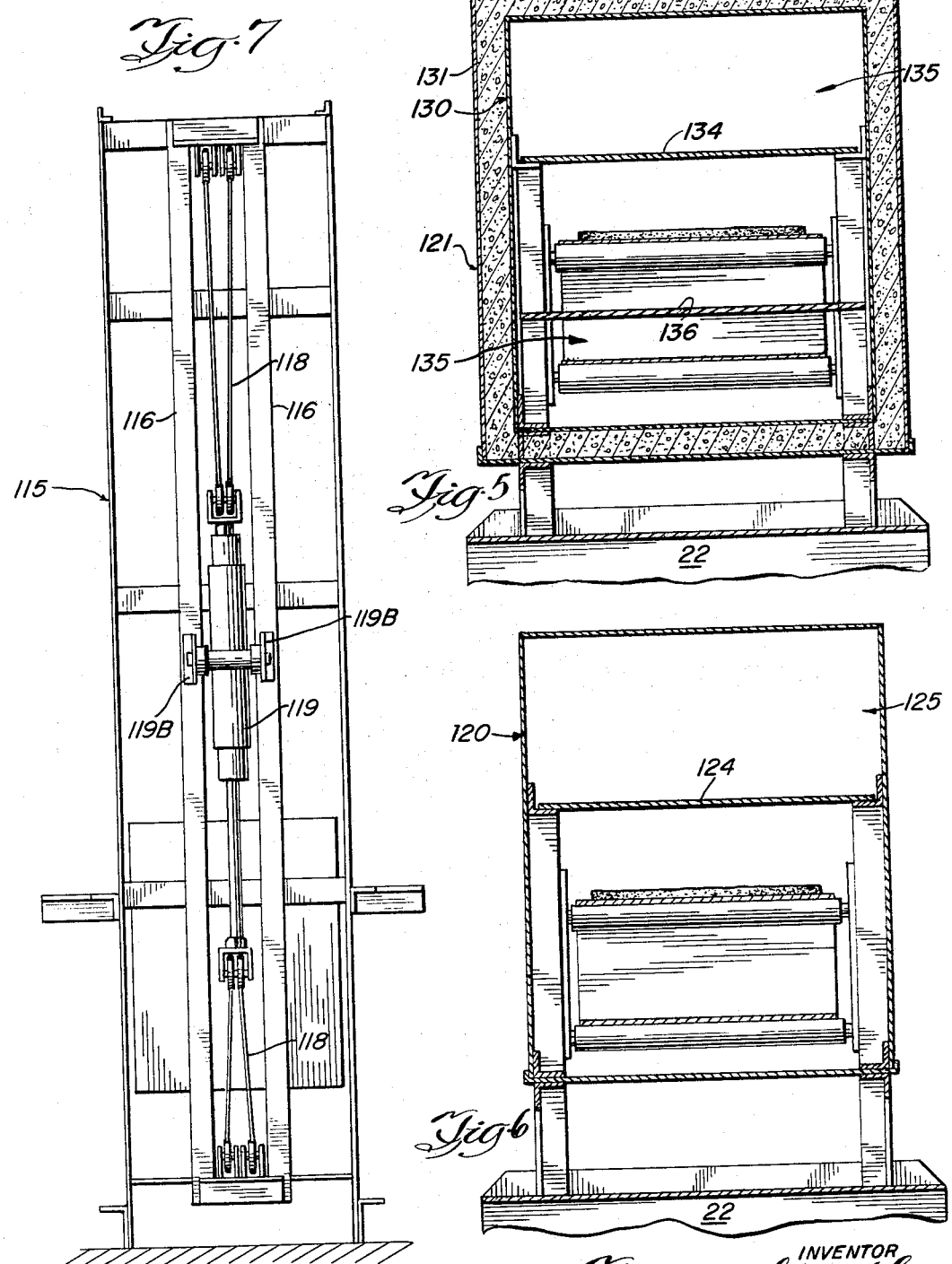

United States Patent Office

3,411,461
Patented Nov. 19, 1968

3,411,461
APPARATUS FOR FORMING PIZZA SHELLS
Fred A. Groth, Chicago, Ill., assignor to Pasquale Associates, Inc., a corporation of Illinois
Continuation-in-part of application Ser. No. 463,521, June 14, 1965. This application May 2, 1966, Ser. No. 546,912
14 Claims. (Cl. 107—15)

ABSTRACT OF THE DISCLOSURE

An apparatus is disclosed for transforming a ball of low shortening dough into a flat shell of dough having attributes of high shortening dough. The apparatus includes an indexing conveyor having a set of plates movable therealong to transport the dough to a press, a docker, a tunnel-like oven and then to a transfer mechanism that removes the heated shell and delivers it to a second conveyor that operates in a cooling tunnel. The indexing conveyor is equipped with a take-up bearing to adjust for slack and tension conditions occasioned by heating effects. A scoop-type transfer mechanism and an elevator are shown for the discharge end of the indexing conveyor. The cooling conveyor has internal ducting establishing efficient air stream flows therein for optimum cooling effects.

---

This application is filed as a continuation-in-part of a pending application Ser. No. 463,521, filed June 14, 1965.

This invention relates to apparatus for forming dough into shells for pizza pies, or the like. It is particularly directed to the transformation of low shortening dough into a flaky pie crust texture versus a grainy hard bread dough texture.

A principal difference between the dough used for baking bread and that used for pies and cakes is in the amount of shortening contained therein. Bread dough contains a relatively small percentage of shortening and the ingredients of such dough include flour, water, salt, sugar, dry milk, lard, and yeast that are dispersed throughout the dough in somewhat random fashion when the dough is made up in batch form. That is to say that the dough does not have the consistent texture that would exist if there was a uniform dispersion of the dough ingredients throughout its mass. In the case of pies or cakes, there is appreciably more shortening used than in bread dough in order to obtain a flaky crust. A rough idea of the percentages of ingredients employed when making pies and cakes would be that the amount of shortening is roughly equal to the weight of the flour with which the shortening is mixed. This increases the likelihood of the shortening being dispersed throughout the mass, which insures that the crust will have the desirable characteristics attendant with high shortening content. It can be appreciated that if low shortening dough can be processed to have the attributes of high shortening dough without requiring the addition of any more shortening, a substantial advance in the art will have been made. The cost saving of such a contribution to the art is obvious. Typical of applications to which this can be put would be in the production of pizza crusts or pie shells. In addition, provision must be made to permit the gas created by the dough to escape from the shell or pizza crust. Also, if it was desired to prebake or blanch the item to permit storage before final usage, this could be done without any great difficulty.

In accordance with the present invention, there is provided apparatus for transforming a low shortening dough, such as bread dough, into a dough having the attributes of a high shortening dough, shape it into the form of a pizza shell and prebake same. The invention is particularly directed to the production of a pizza crust, but obviously this is merely exemplary since it is adaptable to other uses, if such is desired. The primary principle involved is the application of high pressure to a mass of low shortening dough in a heated mold in order to give it the attributes of high shortening dough. This process tends to disperse the various ingredients of the low shortening dough into a generally uniform pattern throughout the dough mixture. In the instant case, the low shortening dough is compressed, under substantial pressure, in an enclosed heated area shaped to define a pizza shell. The shell so formed is then perforated to permit the escape of gas from the pizza shell during a subsequent prebaking operation. The shell is then moved through a conventional convection oven where the prebaking takes place.

In the apparatus herein employed, the dough ball and subsequently formed pizza shell are moved in an intermittent motion by indexing mechanism having a hydraulically operated ratchet type drive. The indexing system is accurately programmed to permit the dough to be compressed into shell form and to be subsequently retained in the oven the desired increment of time to enable it to be baked to the precise condition desired.

The apparatus utilizes a conveyor that is equipped with a plurality of support plates which are successively indexed to predetermined positions along the conveyor path.

A dough ball is deposited on each plate at a first index position, is flattened to a shell configuration at a second index position and is perforated at a third index position immediately before entering an oven tunnel that spans the main length of the intermediate run of the conveyor.

The heated dough shell is removed from its support plate by a transfer scoop that acts in a scraping fashion against each plate when at an index position on the exit side of the oven. The conveyor and the support plates are cooled by a blower and manifold system associated with the lower run of the conveyor.

Each shell, being too hot to handle at the exit from the oven, is processed through a cooling tunnel and conveyor system having a first section through which a stream of ambient air is maintained and having a second section through which a stream of refrigerated air is recirculated, these streams impinging downwardly on the shells to hold the shells on the conveyor system.

The cooling tunnel is located in vertically lapping relation to the tunnel oven and an elevator operates in timed relation to the indexing of the main conveyor to receive each shell from the transfer scoop and transport it to the cooling tunnel and conveyor system. The elevator carries a transfer plate and controls its orientation to retain a dough shell as received from the transfer scoop and to discharge the dough shell at the entry to the cooling system.

The main conveyor elongates at the elevated temperatures associated with normal operation. The rotary mount for one end of the conveyor is carried by a take-up bearing that shifts to take up any slack arising from the elongation of the conveyor. This compensation is provided at the discharge end and the transfer scoop is mounted to shift in unison with the take-up bearing for maintaining accurate registry with each plate which it is to scrape.

Other features and advantages of the invention will be seen by referring to the accompanying drawings, in which:

FIGS. 2A and 2B are enlarged fragmentary side elevational views showing the equipment at opposite ends of the system, with portions thereof broken out and sectioned to facilitate disclosure;

FIG. 5 is a sectional view taken along the line 5—5 of FIG. 2A showing the exit section of the cooling tunnel system;

FIG. 6 is a sectional view taken along the line 6—6 of FIG. 2B showing the entry section of the cooling tunnel system;

FIG. 7 is an end elevational view of the elevator for transporting the heated dough shells to the cooling system;

Figure 1:
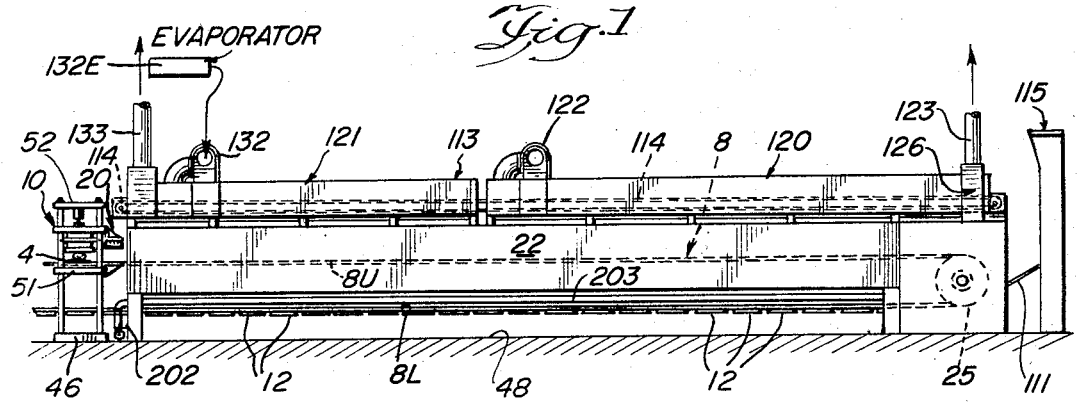
FIG. 1 is a composite side elevational view of a complete system constructed in accordance with the present invention.

The arrangement of the complete system, as best shown in FIG. 1 and FIGS. 2A and 2B, taken together, includes an indexing conveyor 8 carrying a plurality of support plates 12 to advance the same through a horizontal upper run 8U and then through a horizontal lower run 8L. An elongated tunnel oven 22 encloses most of the upper run. A forming press 10 and a docking mechanism 20 are located along the beginning of the upper run to shape and then perforate each dough shell before heating within the oven.

A transfer scoop 105 (see FIG. 2B) is associated with a plate index position at the discharge end of the conveyor 8 to remove the heated dough shell on each support plate before the plate passes around the vertical bend region that joins the upper and lower runs of the conveyor 8.

A cooling tunnel and conveyor system 113 is disposed invertically lapping relation to the tunnel oven 22 and an elevator 115 is positioned to receive each heated dough shell upon removal by the transfer scoop and to transport the dough shell to the conveyor 114 for the cooling system.

Blower facilities 202 are provided along the lower run 8L to blow cooling air against each conveyor plate 12 to condition it for receipt of a dough ball immediately in advance of the forming press 10.

Referring now to FIG. 2A, there is illustrated a divider 2 which is adapted to receive a large quantity of dough and form the dough into balls 4 of a predetermined weight that are subsequently directed to the novel apparatus wherein they are shaped, formed and prebaked into a pizza crust. In order to obtain an eight-ounce pizza, the balls of dough are made nine ounces in weight. This is necessitated by the fact that one ounce is lost through evaporation in the oven.

Upon leaving the divider 2, the dough ball 4 is directed onto a ramp 6 from where it moves onto the main conveyor 8 that is intermittently driven through the action of an indexing mechanism to be discussed in detail hereinafter. As illustrated, the conveyor 8 is made up of a plurality of aluminum plates 12 that are connected to a pair of spaced drive chains 14, 16 (see FIGS. 3 and 4). The conveyor 8 indexes the plates 12 to and through various stations, including the forming press 10, wherein each dough ball 4 is compressed into a circular pizza shell 86, a docking assembly 20, wherein the shell 86 is perforated to permit the release of gas during the baking operation, and then through an oven 22, wherein it is baked. Additional apparatus for preliminary mixing and handling of the dough is not shown and forms no part of the present invention.

The aluminum plates 12 of the conveyor are spaced apart in a longitudinal direction a sufficient amount to facilitate movement of the conveyor about longitudinally spaced rotary mounts 24, 25. The rotary mount 24 is illustrated as a drive sprocket and the rotary mount 25 is illustrated as a floatingly mounted idler sprocket. The plates 12 are sized to accommodate a maximum size pizza shell, for which size the forming press 10 is also constructed. It is obvious, of course, that the size of the forming press can be varied as desired by changing molds.

The dough balls 4 are deposited on each of said plates in succession and are formed into pizza shells. Suitable mechanisms can be provided to feed the dough onto the plates at the required time interval. Thus, if a maximum size pizza shell of sixteen-inch diameter is to be formed, the aluminum plates are made sufficiently large to accommodate same.

The conveyor 8 is moved intermittently by the chains 14, 16 which may be slidably supported by suitable framing or rails along the upper and lower runs 8U and 8L and which are guided around vertical return bend regions by the longitudinally spaced sprockets 24, 25. The diameter of the sprockets is sufficiently large to facilitate movement of the plates about the vertical return bend regions with sufficient clearance to prevent binding. The intermittent indexing action imparted to the conveyor is accomplished by means of a hydraulically operated ratchet mechanism which moves the sprocket 24 the desired increment at regularly timed intervals. The timing is set to enable the dough to be compressed into a pizza shell within the forming press 10 and the press components withdrawn before the shell is moved longitudinally.

Briefly, the aluminum plate 12 containing a ball of dough 4 is moved into the forming press 10, the press is operated to compress the dough into a sheet, the press is withdrawn, and thereafter the conveyor is moved to move the pizza shell out from the press and direct another plate having a ball of dough thereon into position.

Returning now to the drive mechanism for the conveyor, it is seen that there is provided a double acting cylinder 26 disposed adjacent the drive sprocket 24. From one end of the cylinder 26 extends a piston rod 27 that has secured thereto a pin 28 located in a slot 31 formed in an arm 29. The other end of arm 29 is rotatably mounted on a sprocket drive shaft 30. Secured to arm 29 at an intermediate portion thereof is spring loaded pawl 32 that is positioned to engage the ratchet teeth 33a of ratchet wheel 33. The ratchet wheel is secured to shaft 30 and thus rotation thereof will drive the conveyor 8. The stroke of piston rod 27 is designed to rotate sprocket 24 clockwise the required amount to index the conveyor to advance each successive plate 12 from the forming press 10 to the docking mechanism 20. The control mechanism for actuating hydraulic cylinder 26 will be discussed hereinafter.

As previously indicated, the dough ball 4 is moved by the conveyor 8 to the forming press 10, wherein the ball is subject to high presure to give low shortening dough the attributes of high shortening dough.

The press 10 includes a base plate 46 that is mounted on a floor 48, or other support, and a plurality of upstanding vertical columns 50. Connected to the upper portion of columns 50 by nuts 54 is a stationary platen 52. Connected intermediate the ends of the press and serving as a support and guide for the conveyor 8 is an intermediate support member 51. In order to provide clearance for the chains 14, 16, a filler plate 55 is positioned between and serves as a support for plate 12 when they are located in the press.

The movable portion of the press includes a reciprocating plunger 56 which is guided by the columns 50 and is reciprocated by a double acting hydraulic cylinder 58 which includes a piston rod 60 that is secured to reciprocating plunger 56.

Figures 3, 4:
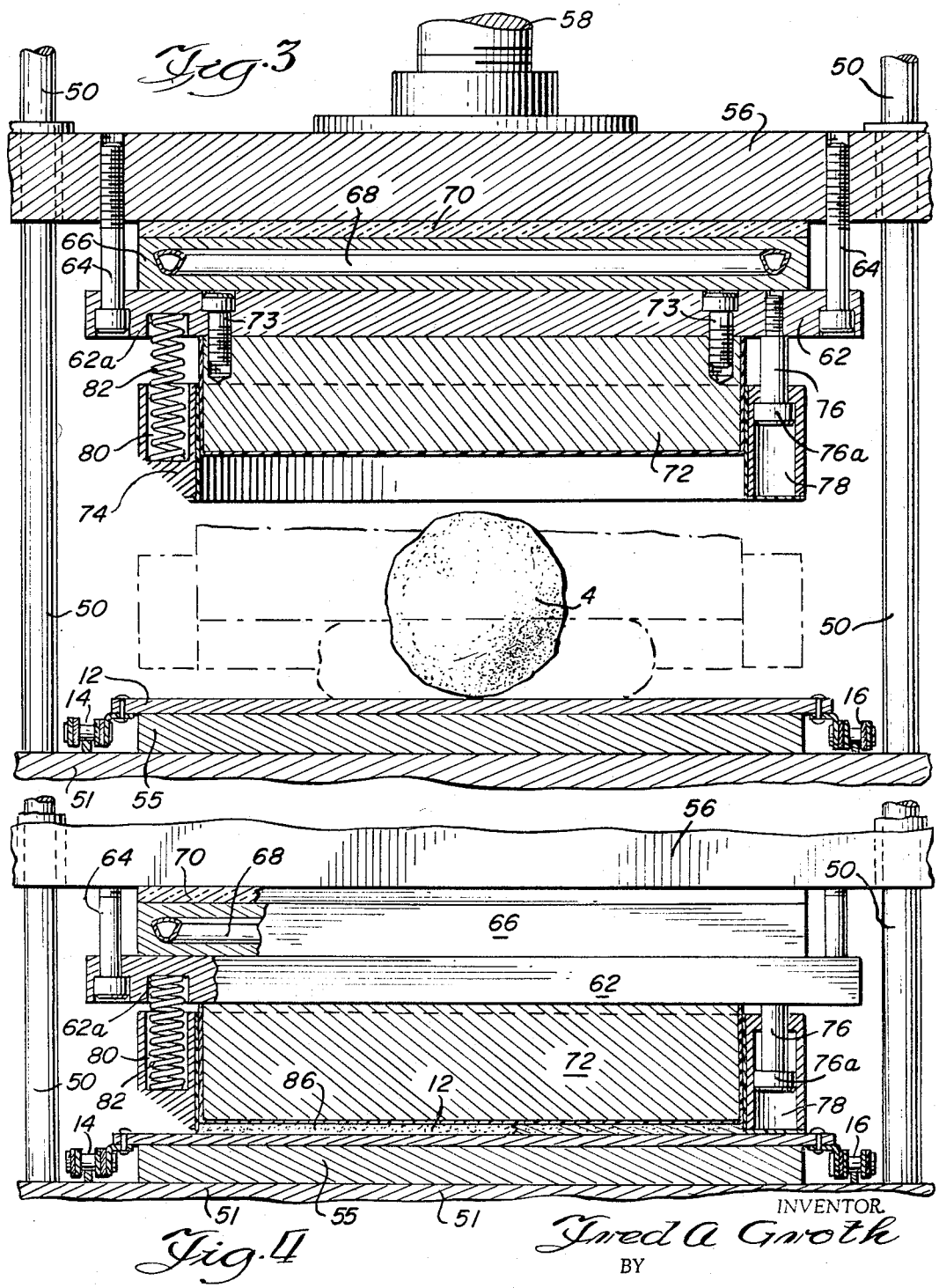
FIG. 3 is an enlarged sectional view taken along the line 3—3 of FIG. 2A showing the lower portion of the press unit for compressing the dough.
FIG. 4 is a view similar to FIG. 3 showing the position of the various elements when the pizza shell is formed.

The details of the operation of the movable forming press can best be seen by referring to FIG. 3. As shown therein, the reciprocating plunger 56 has connected to its undersurface, at a slight distance therefrom, a mold support plate 62. The support plate is held in position relative to the plunger by bolts 64. Located between the mold support plate 62 and plunger 56 is a heating plate 66 within which is disposed a heating unit 68. The heating plate 66 is insulated from the plunger 56 by an insulator 70. The heating unit 68 is provided to heat the mold and cause the dough to relax and form a shell free from excessive shrinkage and to adhere to the aluminum plate for subsequent operations. After a short baking cycle, the shell is free from sticking to the plate. It has been found that the foregoing is satisfactorily accomplished if the mold is a minimum of 250° F. and the plates are cooled to about 125° F. The arrangement for conditioning the plates in this manner will be discussed in detail hereinafter.

Secured to the undersurface of the mold plate 62 by bolts 73 is a cylindrically shaped center mold member 72. The circumference of center member 72 defines the outer periphery of the pizza shell to be formed by the forming press. Surrounding the center mold member 72 and serving to restrain the dough beneath the center mold member is an annular ring 74 which depends from the support plate 62 and is held relative thereto by a plurality of circumferentially spaced bolts 76 having their head portions 76a located in downwardly extending recesses 78 formed in the ring 74. Interspersed between the bolts 76 and biasing the ring outwardly from plate 62 are circumferentially spaced compression springs 82 having one end portion located in recesses 62a of plate 62 and their other end located in upwardly extending cylindrical recesses 80 formed in annular ring 74. The bottom surface of mold member 72 and inner surfaces of ring 74 are coated with Teflon to prevent sticking.

When the hydraulic cylinder 58 is operated to move the reciprocating plunger 56 downwardly, the center member 72 engages the dough ball 4 to form it into a pizza crust having an outer diameter equal to the inner diameter of the annular ring 74. During the downward movement of the reciprocating plunger 56, the ring 74 engages the plate 12 of the conveyor 8 to prevent the dough from extruding out between the bottom surface of the ring 74 and the plate 12. The relative movement of the center member 72 permitted by the lost motion action between the plates 62 and rings 74 completes the compressing of the dough ball 4 into the pizza shell 86 in the manner shown in FIG. 4. The high pressures placed on the dough shell, which are in the order of 200–300 pounds per square inch, plus the 200° F. mold heat, bring about a homogenization of the dough ingredients, which results in a finished product having the characteristics of high shortening doughs, such as pie, or cake dough. Suitable safety mechanisms are provided so that the press cannot come down until a plate is in the press.

Figure 8:
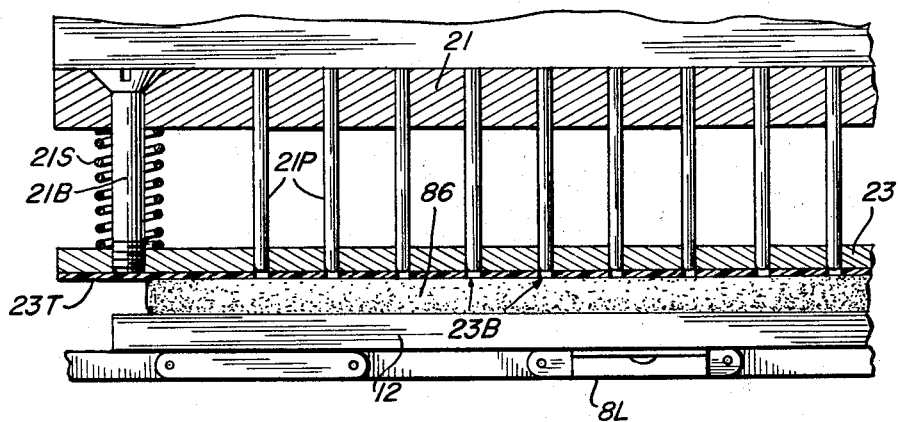
FIG. 8 is an enlarged fragmentary section taken on the line 8—8 of FIG. 2A and showing the docking mechanism for perforating each shell prior to heating.

The docking mechanism 20, which is best shown in FIG. 8, includes a carrier plate 21 having an upstanding flange 21F bolted to the plunger 56 to undergo simultaneous vertical reciprocation therewith. The carrier plate 21 is equipped with a multiplicity of depending docking pins 21P distributed in a predetermined array to span the dough shell. A stripper plate 23 is provided with a matched array of guide bores 23B to receive the pins 21P. Stripper bolts 21B and encircling compression springs 21S mount the stripper plate 23 to underlie the carrier plate and undergo relative closure movement towards the carrier plate 21 when the carrier plate descends and lowers the stripper plate against the dough shell. Continued movement of the carrier plate projects the pins 21P through the stripper and into the dough shell to suitably perforate the same.

Upon return of the carrier plate, the stripper plate 23 facilitates withdrawal of the pins 21P and then releases and rises above the now perforated dough shell 86. The stripper plate 23 has a release face in the form of a coating 23T of a lubric plastic such as Teflon to insure that the shell does not cling to it.

The control system for the conveyor and press consists of a motor operated pump 98 which takes liquid from a reservoir 100 and directs it through a series of four-way valves 102, 104 that control the operation of cylinders 26, 58, respectively. The electrical control system, which is essentially conventional in nature and is not illustrated herein, is set up to operate the valve 102 to move cylinder 26 to index an aluminum plate 12 from a first index position where it receives a ball of dough 4 to a second index position within the forming press 10. When this is completed, the valve 104 is positioned to direct fluid to cylinder 58 to force the platen against the ball 4 located in the forming press to compress it into a flat sheet. When this is completed, the valve 104 is repositioned to operate cylinder 58 to retract the press, after which cylinder 26 is again operated to move the conveyor to locate a subsequent plate and dough ball within the forming press 10.

As one example of an acceptable timing cycle, the machine can be set to produce ten shells per minute, or 600 per hour. This gives a total time of six seconds between indexing, which time is divided approximately as follows. The press is held closed for four to five seconds, during which period the mold is heated and the dough is released so that it does not shrink excessively. The balance of the time is used for operating the press and indexing the conveyor.

After the pizza shell has been formed, and the press retracted, the conveyor 8 is moved longitudinally to move the plate with the pizza shaped dough to an index position beneath the docking mechanism 20 which is carried outboard on the plunger 56 to operate concurrently therewith and perforate the outer shell of the pizza dough to permit the escape of carbon dioxide gas during the baking operation.

When the pizza shell leaves the docker 20, it is moved step-by-step through the oven 22, where the shell is prebaked on both sides to stop the yeast action and effect ample evaporation of the water, so that the pizza shell is stable where it can be stored for reasonable periods without formation of mold or turning sour. Baking also causes the shell to release from the plates.

The oven 22 is a generally conventional gas oven wherein gas is supplied to a burner 200 to bake the pizza shells directed into the oven. The size of the oven is designed to locate the shells in the oven a sufficient length of time to prebake the shell the desired amount. Suitable dampers and flues are provided to efficiently operate the oven.

Figure 9:
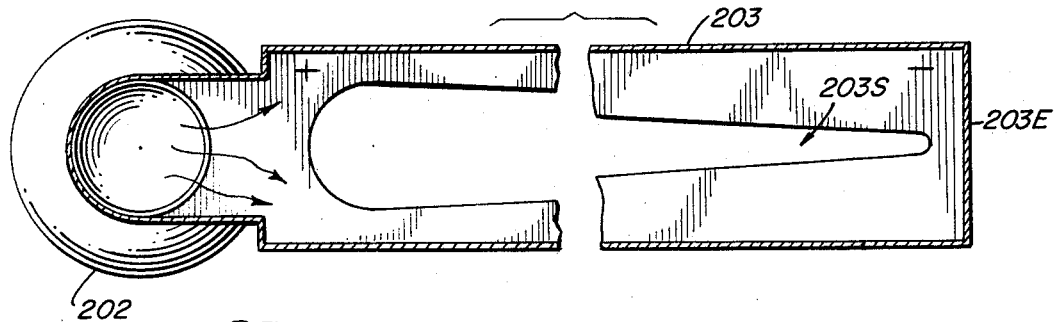
FIG. 9 is an enlarged fragmentary section taken on the line 9—9 of FIGS. 2A and 2B and showing a blower fed cooling manifold.

As previously mentioned, it is desirable that the plates 12 be approximately 125° F. before they enter the press. To accomplish the cooling of the plates after they come out of the oven, a blower system is located as shown in FIGS. 1, 2A and 2B. This system consists of a blower fan 202 that feeds an elongated air discharge manifold 203 which is disposed substantially full length between the oven 22 and the lower run 8L of the main conveyor. As best seen in FIG. 9, the remote end 203E of the manifold 203 is closed and the distribution of static pressure is maximum at the closed end and diminishes gradually to a minimum at the blower inlet end. The discharge opening 203D for the manifold is provided by a substantially full length tapered slot 203S that is narrowest at the high pressure end 203E and widest at the lower pressure blower end to proportion the flow of cooling air from the manifold substantially uniformly along its length. The manifold slot is oriented towards the reverse faces of the plates 12 during their travel along the lower run 8L of the conveyor.

Thus, it can be seen that the above apparatus can be used to take a ball of dough having relatively low shortening content and, through the application of pressure and heat, transform it into a product that will have the attributes of dough having a high percentage of shortening content therein. Thus, bread dough can be transformed into "pie" or "cake" dough, with the end result that a pizza shell made out of such a dough will be flaky and have a "pie crust" like texture.

Other apparatus can be used for performing this dough shaping method and, of course, the invention is not limited to the specific components illustrated and described herein. The various drive mechanisms and press construction, as well as docking assembly and oven unit, are intended to be merely exemplary and not limiting. Various substitutions of these various components will be obvious to one skilled in the art.

In a practical commercial installation, the oven 22 may be as long as 60 feet and the oven is set to bring the dough shells to a temperature in the range of 375 to 400° F. Operation at these temperatures causes the conveyor 8 to elongate relative to the associated support framing. It is necessary to take-up slack from the conveyor 8 and this is accomplished by shiftably mounting the support shaft 100 for the idler sprocket 25 which serves as the rotary mount for the discharge end of the conveyor.

Opposite ends of the support shaft 100 are journaled in take-up bearings 101 that are mounted rigidly with a slidable sub-frame 102. Fixedly mounted guide rails 103 associated with the main framing of the machine underlie the bearings 101 and thereby support the corresponding end of the sub-frame 102. The opposite end of the sub-frame is slidably supported in another fixedly mounted guide shoe 104'. Each guide rail 103 carries a fixedly mounted spring seat 103S, with a guide rod 103R extending therethrough and encircled by a bias spring 104" normally to urge the take-up bearings 101 in a conveyor elongating direction.

Thus, when the conveyor 8 elongates as it progressively heats up in the oven 22, the incipient slack is taken-up by the action of the bias spring 104" acting on the guide rod 103R to advance the take-up bearings 101 towards the right. The parts are shown in fully extended position in FIG. 2B. Upon subsequent cooling, the conveyor 8 contracts and automatically draws the bearings 101 to the left to compress the springs 104".

The entire sub-frame 102 shifts to and fro with the bearings and it, in turn, mounts the transfer scoop 105 to establish and maintain the same in predetermined registry with the final plate index position at the discharge end of the conveyor 8. This final plate index position is subject to movement associated with the elongation of the conveyor.

The transfer scoop 105 effects a scraping action on the surface of each support plate 12 when the plate is at the final index position. A main drive link 106 is pivoted on a bearing 107 that rides with the sub-frame 102. The scoop 105 is hinged to the top of the link 106 and has its forward end mounted on a cross rod 108 that orients the scraping edge in position to move beneath the edge of the pizza shell 86 and progressively scoop the shell free of its support plate 12. The drive link 106 has a lost motion connection with a piston rod 109 that is powered by a pneumatic cylinder 110 carried on the sub-frame 102.

The limit positions of the travel stroke of the scoop 105 are illustrated in full and phantom lines in FIG. 2B. The stroke is sufficiently rapid to remove the pizza shell and deposit the same upon the transfer plate 111 located at an outboard receiver position adjacent to the discharge end. An intermediate guide shelf 112 is provided to assure that the removed pizza shell clears the main conveyor and deposits properly on the transfer plate 111. In the illustrated embodiment, the receiver position is in endwise alignment and the scraping stroke is oriented towards the discharge end of the conveyor.

The pizza shell 86 is at an elevated baking temperature at the time of removal from the main conveyor 8. Accordingly, facilities are provided for cooling these heated shells and in the illustrated embodiment, a cooling tunnel 113 overlies the oven tunnel 22 and houses a belt conveyor 114 which delivers the finally cooled shells adjacent the upstream end of the main conveyor (see FIG. 2A). A cross conveyor (not shown) may transport the cooled shells to a final packaging station. In this way, a plurality of parallel baking and cooling lines may be serviced by a single cross conveyor.

Returning now to FIG. 2B, an elevator 115 is provided to control the movement of the transfer plate 111 from its partly inclined full line receiver position adjacent and beneath the elevation of the discharge end of the oven conveyor 8 to its sharply inclined phantom line discharge position adjacent and above the elevation of the receiver end of the cooling conveyor 114. The elevator 115, as best shown in FIGS. 2B and 7, includes a vertical framework providing a pair of side-by-side guide rails 116 defining a guideway running vertically upward from the receiver position and terminating in an obliquely angled region at the approach to the discharge position. A wheeled carriage 117 rides in the guideway defined by the rails 116 and rigidly mounts the transfer plate 111 so that the angle of the transfer plate 111 is determined by the orientation of the carriage 117. When the carriage is vertical (the receiver position), the transfer plate 111 is at an angle (for example, 30°) less than the angle of repose for the dough shell. When the carriage is inclined (the upper discharge position), the transfer plate 111 is at an angle (for example, 60°) greater than the angle of repose for the dough shell.

A double-ended block and tackle rigging 118 is mounted on the vertical framework and powered by a pneumatic cylinder and piston unit 119 that is positioned medially by mounting brackets 119B on the rear face of the rails 116. The complete up and down operation of the elevator must be completed during the indexing interval in order that the transfer plate may return to the receiver position in time to receive the next pizza removed by the transfer scoop.

The cooling tunnel is comprised of aligned successive sections 120, 121. The first section 120, as best seen in FIGS. 1, 2B and 6, is an uninsulated ductwork supported in elevated relation upon the oven tunnel 22 and having a blower 122 at its downstream end and a vent riser 123 at its upstream end for circulating a gas coolant stream. A set of closely spaced wall panels 124 positioned within the head space of the ductwork 120 provide an internal partition defining an elongated entry plenum chamber 125 having between each set of adjacent panel edges a tranversely elongated discharge opening 124D directed generally downwardly towards the cooling conveyor 114.

In the illustrated embodiment, ambient air is utilized to cool the dough shells traveling through the first tunnel section. Thus, intake to the blower 122 is connected in any convenient way to a source of outside air and the event riser 123 may be run through the roof of the building in which the equipment is installed. The air travels lengthwise through the entry plenum chamber 125 and emerges as a vertical sheet from each of the lengthwise spaced transverse openings 124D to impinge upon the dough shells in a sense to maintain the shells against the belt conveyor 114. The air then passes lengthwise through the ductwork 120 to emerge through a side duct 126 that leads to the vent riser 123.

A similar ductwork 130 (see FIG. 5) serves as the core of the second cooling tunnel section 121 and is surrounded by foam insulation and a cover duct 131. The ductwork 130 has a blower 132 at its downstream end and a vent riser 133 thereadjacent. A set of closely spaced wall panels 134 positioned within the head space of the ductwork 130 provides an internal partition defining an elongated entry plenum chamber 135 having between each set of adjacent panel edges a transversely elongated discharge opening 134D.

Refrigerated air is recirculated through the second tunnel section to finish the cooling of the dough shells with lower temperature coolant. Thus, intake to the blower 132 is taken from an evaporator 132E which may be mounted on the building roof and the spent air passes through a vent riser 133 for return to the evaporator.

The second tunnel section has a lower partition wall 136 beginning at the far downstream end and terminating adjacent the upstream end to provide an exit port 136P leading from the region of the cooling conveyor and communicating with an elongated exit plenum chamber 137 extending full length downstream of the second section 121. The flow of the refrigerated air enters downstream into the upper plenum chamber 135, travels lengthwise therein and emerges as a vertical sheet from each of the discharge openings 134D to impinge upon the dough shells and then flow upstream towards the exit port 136P to emerge through the downstream end of the exit plenum chamber 137.

Thus, while preferred constructional features of the invention are embodied in the structure illustrated herein, it is to be understood that changes and variations may be made by those skilled in the art without departing from the spirit and scope of the appended claims.

What is claimed is:

1. Apparatus for conveying dough shells and comprising a conveyor carrying a plurality of support plates in spaced relation, main framing structure mounting said conveyor to undergo elongation in response to extended exposure to heat, means for indexing the conveyor to advance the plates step by step along a prescribed path having substantially horizontal upper and lower runs and generally vertical return bend regions, said indexing means including a separate rotary mount engaging each end of the conveyor for guiding the conveyor through the corresponding vertical return bend region of the path, a take-up bearing shiftably mounted relative to said main frame structure supports the rotary mount for the discharge end of the conveyor and resiliently yieldable means biases said take-up bearing in a follower relation to draw slack from said conveyor, means for providing a dough shell on each plate along the beginning of the upper run of the conveyor, a heated oven tunnel surrounding the intermediate region of the upper run, transfer means for removing the dough shell from each plate along the end of the upper run, and means for cooling each plate along the lower run of the conveyor, said apparatus including a sub-frame shiftably mounted from the main frame structure to move in unison with the take-up bearing, said sub-frame mounting said transfer means in predetermined registry with a plate index position that is determined by the movement of the discharge end to maintain such registry throughout such movement.

2. Apparatus for conveying dough shells and comprising a conveyor carrying a plurality of support plates in spaced relation, means for indexing the conveyor to advance the plates step by step along a prescribed path having substantially horizontal upper and lower runs and generally vertical return bend regions, means for providing a dough shell on each plate along the beginning of the upper run of the conveyor, a heated oven tunnel surrounding the intermediate region of the upper run, transfer means for removing the dough shell from each plate along the end of the upper run, and means for cooling each plate along the lower run of the conveyor, said transfer means comprises a scoop, linkage means for supporting the scoop to overhang the upper run of the conveyor with the scoop angled downwardly towards the discharge end of the conveyor and having its leading edge adjacent a lateral extremity of a plate index position adjacent the discharge end of the conveyor, and means for driving the linkage means when a plate is at said index position to shift the scoop in scraping relation across such plate in a direction towards the discharge end of the conveyor to pick up and remove the dough shell on such plate.

3. Apparatus for conveying dough shells and comprising a conveyor carrying a plurality of support plates in spaced relation, means for indexing the conveyor to advance the plates step by step along a prescribed path having substantially horizontal upper and lower runs and generally vertical return bend regions, means for providing a dough shell on each plate along the beginning of the upper run of the conveyor, a heated oven tunnel surrounding the intermediate region of the upper run, transfer means for removing the dough shell from each plate along the end of the upper run, means for cooling each plate along the lower run of the conveyor, a cooling tunnel in vertically lapping relation to said oven tunnel, a second conveyor extending through said cooling tunnel and operating in an opposite direction to the first conveyor, and a vertical conveyor having a reversibly operable transfer plate shiftable between a receiver position adjacent the discharge end of the first conveyor and a discharge position at the entry end of the second conveyor.

4. Apparatus in accordance with claim 3 and wherein said vertical conveyor includes means operable when the transfer plate is at said receiver position for orienting said transfer plate at an angle less than the angle of repose for the dough shell to receive and maintain the dough shell during vertical travel and operable when the transfer plate is at the discharge position for orienting said transfer plate at an angle greater than the angle of repose for the dough shell to effect discharge of the dough shell to said second conveyor.

5. Apparatus for conveying dough shells and comprising a conveyor carrying a plurality of support plates in spaced relation, means for indexing the conveyor to advance the plates step by step along a prescribed path having substantially horizontal upper and lower runs and generally vertical return bend regions, means for providing a dough shell on each plate along the beginning of the upper run of the conveyor, a heated oven tunnel surrounding the intermediate region of the upper run, transfer means for removing the dough shell from each plate along the end of the upper run, means for cooling each plate along the lower run of the conveyor, and a cooling tunnel having a second conveyor extending therethrough and positioned to receive a heated dough shell after discharge from said first conveyor, said cooling tunnel having an elongated entry plenum chamber flanking the second conveyor and having discharge openings spaced therealong and directed generally towards the path of said second conveyor.

6. Apparatus for conveying dough shells and comprising a conveyor carrying a plurality of support plates in spaced relation, means for indexing the conveyor to advance the plates step by step along a prescribed path having substantially horizontal upper and lower runs and generally vertical return bend regions, means for providing a dough shell on each plate along the beginning of the upper run of the conveyor, a heated oven tunnel surrounding the intermediate region of the upper run, transfer means for removing the dough shell from each plate along the end of the upper run, means for cooling each plate along the lower run of the conveyor, cooling tunnel means having conveyor means positioned to receive each dough shell after removal by said transfer means, said cooling tunnel means having first and second successive tunnel section to precool the dough shells during passage vances the dough shells in sequence, means for circulating a first stream of gaseous coolant through said first tunnel section to precool the dough shells during passage therethrough and means for circulating a second stream of lower temperature gaseous coolant through said second tunnel section to further cool the dough shells.

7. Apparatus in accordance with claim 6 and wherein each tunnel section has an elongated entry plenum chamber flanking the conveyor means and having discharge openings spaced therealong and directed generally towards the path of said conveyor means.

8. Apparatus in accordance with claim 7 and wherein each tunnel section has an upstream coolant inlet to the plenum chamber and a downstream coolant exit from the path of the conveyor means.

9. Apparatus in accordance with claim 8 and wherein said circulating means for said second tunnel section has a coolant blower fan opening into the corresponding entry plenum chamber at a downstream location, and an internal baffle wall disposed within said second tunnel section blocks exit flow except at a remote upstream region and defines an elongated exit plenum chamber leading substantially full length downstream.

10. Apparatus in accordance with claim 9 and wherein said circulating means for said second tunnel section includes a coolant refrigeration and recirculation system and wherein said circulating means for said first tunnel section includes a blower fan connected to circulate external ambient air.

11. Apparatus for conveying dough shells and comprising a conveyor carrying a plurality of support plates in spaced relation, means for indexing the conveyor to advance the plates step by step along a prescribed path having substantially horizontal upper and lower runs and generally vertical return bend regions, means for providing a dough shell on each plate along the beginning of the upper run of the conveyor, a heated oven tunnel surrounding the intermediate region of the upper run, transfer means for removing the dough shell from each plate along the end of the upper run, and means for cooling each plate along the lower run of the conveyor, said means for cooling includes a manifold disposed vertically between said oven tunnel and said lower run of the conveyor, said manifold having an entry, a closed end remote from said entry and having discharge outlet means distributed between said closed end and said entry and oriented towards said lower run, and blower means connected to said entry to blow gaseous coolant into said manifold for flow through said discharge outlet means, said discharge outlet means being wider at regions adjacent said entry to proportion the discharge flow area substantially inversely to the static pressure within the manifold.

12. Apparatus in accordance with claim 11 and wherein said manifold extends a substantial fraction lengthwise beneath said oven tunnel and said entry and blower means are at one lengthwise end of said manifold.

13. Apparatus for conveying dough shells and comprising a conveyor carrying a plurality of support plates in spaced relation, means for indexing the conveyor to advance the plates step by step along a prescribed path having substantially horizontal upper and lower runs and generally vertical return bend regions, means for providing a dough shell on each plate along the beginning of the upper run of the conveyor, a heated oven tunnel surrounding the intermediate region of the upper run, transfer means for removing the dough shell from each plate along the end of the upper run, and means for cooling each plate along the lower run of the conveyor, said means for providing a dough shell includes means for depositing a body of dough on each plate when at a first plate index position, means including a press for flattening and shaping the body of dough to provide a dough shell on each plate when at a second plate index position, and docking means for perforating the dough shell on each plate when at a third plate index position.

14. Apparatus in accordance with claim 13 wherein said docking means includes a vertically reciprocable carrier plate, having a multiplicity of depending docking pins, a stripper plate having a lubric plastic contact face and having a multiplicity of guide bores opening therethrough, and suspension means mounting said stripper plate to underlie said carrier plate in relatively vertically shiftable relationship and receive said docking pins in vertically projectable relation when said carrier plate descends to lower the stripper plate against the dough shell.

References Cited
UNITED STATES PATENTS

| | | | |
|---|---|---|---|
| 1,203,122 | 10/1916 | Lawhead | 107—58 |
| 1,280,205 | 10/1918 | Garza | 107—57 |
| 2,597,271 | 5/1952 | Williams | 107—57 |
| 2,717,560 | 9/1955 | Kottmann. | |
| 3,058,434 | 10/1962 | De Jersey. | |
| 3,097,588 | 7/1963 | De Jersey | 99—423 |

WALTER A. SCHEEL, *Primary Examiner.*

ARTHUR O. HENDERSON, *Assistant Examiner.*

UNITED STATES PATENT OFFICE
CERTIFICATE OF CORRECTION

Patent No. 3,411,461 November 19, 1968

Fred A. Groth

It is certified that error appears in the above identified patent and that said Letters Patent are hereby corrected as shown below:

Column 10, line 55, "section to precool the dough sheels during passage" should read -- sections through which the conveyor means ad- --.

Signed and sealed this 10th day of March 1970.

(SEAL)
Attest:

Edward M. Fletcher, Jr.  WILLIAM E. SCHUYLER, JR.
Attesting Officer  Commissioner of Patents